W. G. VANCE.
HARROW ATTACHMENT.
APPLICATION FILED JULY 5, 1912.

1,062,063.

Patented May 20, 1913.

WITNESSES:
M. S. Crandall
G. W. Barr

INVENTOR
W. G. VANCE
BY
H. E. Gardiner
ATTORNEY

UNITED STATES PATENT OFFICE.

WILLIAM G. VANCE, OF HAGIE, WYOMING.

HARROW ATTACHMENT.

1,062,063.  Specification of Letters Patent.  Patented May 20, 1913.

Application filed July 5, 1912. Serial No. 707,706.

*To all whom it may concern:*

Be it known that I, WILLIAM G. VANCE, a citizen of the United States, residing at Hagie, in the county of Laramie and State of Wyoming, have invented certain new and useful Improvements in Harrow Attachments, of which the following is a specification.

My invention relates to harrows and has for its object the construction of means for raising the rear portion of the harrow from the ground while in operation for the purpose of clearing it of trash and other obstructions which the teeth of the harrow gather and without taking hold of the harrow itself.

The invention consists of the device here shown and described and in the durability of construction, efficiency and simplicity of operation, and in the construction and arrangement of parts, as will be more fully explained and pointed out in the claims.

I have illustrated my invention in the accompanying drawing in which—

Figure 1:
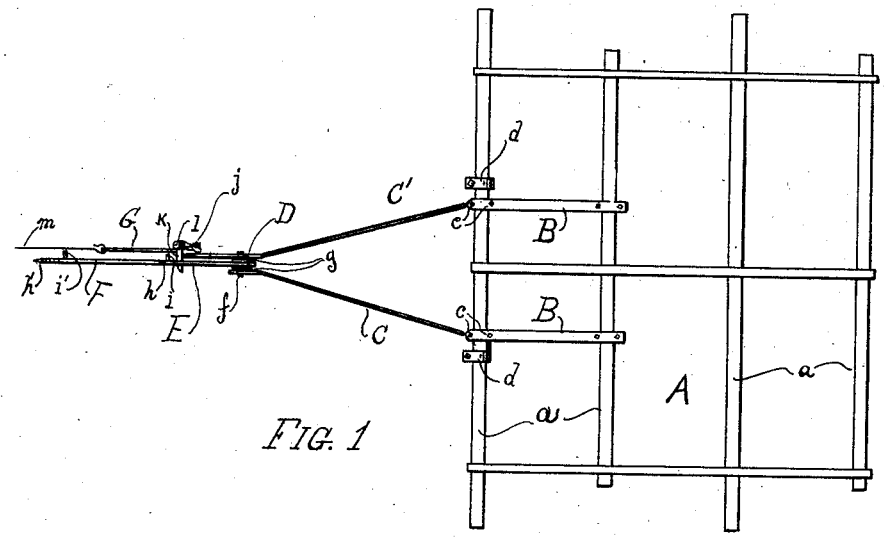
Figure 2:
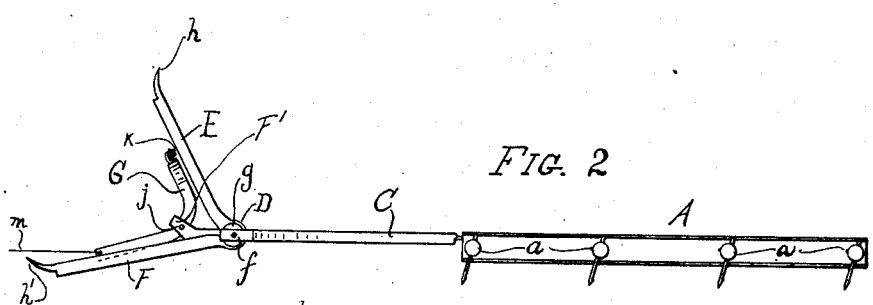
Figure 3:
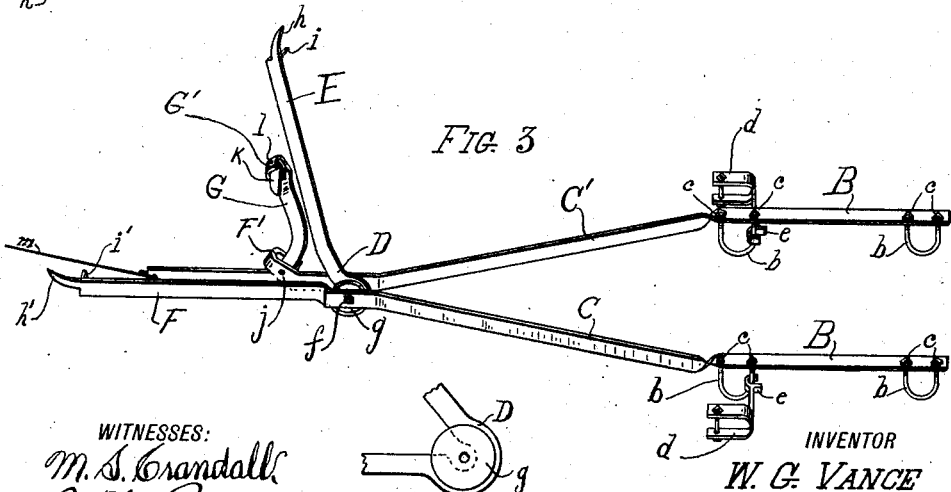
Figure 4:
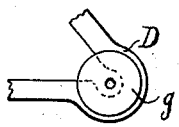

Figure 1 is a plan view of harrow with my invention attached. Fig. 2 is a view of the same in side elevation. Fig. 3 is an enlarged perspective view of the device detached but ready for adjustment to a harrow. Fig. 4 is an enlarged detail view of fork and attached washer.

Referring to the drawing, A is a harrow of ordinary construction with the usual bars $a$ to which the teeth are secured. The bars shown are the usual movable kind so arranged to move with the teeth at an angle, but the means for moving them are not shown.

B are bars secured to the top of the two rear harrow bars by means of clevises $b$ which pass under the bars $a$ and through openings in the bars B and are secured by nuts $c$. The bars B are freely secured to the bars $a$ about twelve inches apart in practice so as to permit a limited rocking movement of the harrow. The bars B are further secured to the harrow bars by clamps $d$ which are firmly attached to the rear bar $a$ just outside of the bars B. The clamps have hooked extensions $e$ which engage the rear clevises, $b$, hooking into the sides of the latter, preventing them from slipping on the harrow bars and at the same time permitting a limited rocking movement of the latter without changing the position of the lifting device.

Integral with the bars B but bent so as to stand vertically edgewise, are the braces C and C' extending rearwardly from the harrow in the form of a V, the outer ends approaching, the extreme ends being parallel and having lateral openings which register for the insertion of a bolt $f$. The bolt is the axis of a fork D having two prongs E and F. A bearing is formed for the axis and also for the braces C and C' by the washers $g$ which are welded to each side of the curved or bearing portion of the fork and have central openings for the passage of the bolt, as shown in Fig. 4. The ends of the prongs E and F are split, the parts $h$ and $h'$ being pointed to freely enter the ground, the other parts $i$ and $i'$ being bent at right angles to prevent the prongs entering the ground too far and to act as supports for the harrow as it is lifted. The prong E is slightly shorter than the prong F to escape the trash left when the harrow is raised upon the latter.

The free end of the brace C' is extended somewhat beyond the axis of the fork and turned up at an angle of about thirty degrees and bent outwardly parallel with the turned up part to form a bearing F' for the trigger G which throws the fork. A pin or bolt $j$ secures the trigger in the bearing and forms an axis on which the trigger operates. The latter is shaped somewhat like the fork but has a larger curve at the central part. One prong normally drags upon the ground beside the prong F of the fork, the other extending upwardly with its upper extremity bent at right angles toward the fork and forming a groove G' opening toward the harrow and in which a catch $k$ is pivoted by a pin $l$. The end of the groove clears the path of the fork and the catch is pivoted near its end so that when displaced it normally falls into a horizontal position in the path of the prongs and is held firmly in the groove against backward pressure of the prongs. The outer rear corner of the catch is rounded to permit the prongs to freely pass in the forward direction. A wire $m$ is secured to the free end of the trigger by which the latter is operated and when not in use may drag upon the ground.

The operation of my device will be readily understood and is as follows: When it is necessary to raise the harrow to clear it of trash the wire $m$ is seized and given a quick upward jerk, lifting the trigger and thrusting the catch forcibly against the prong E. The latter falls upon the ground near the center of the V, the point h entering the ground where it is held as the harrow moves forward. The movement of the harrow which leaves the prong E in the rear brings the prong F upward and forward to engage the ground in the same manner until the fork assumes the normal position shown in the drawing. As the rear of the harrow is raised the trash will drop to the ground and be left in the harrow's path. The process may be repeated as often as necessary. The lifting must always be done while the harrow is moving and the weight is raised upon the prongs by the forward motion. The device may be modified for application to different styles of harrows and other means involving the same principles may be utilized to obtain similar results without departing from the spirit or purpose of my invention.

Having described my invention, what I claim as new and desire to secure by Letters Patent, is,—

1. The combination with a harrow, braces freely secured to the bars thereof and adapted to permit a limited rocking movement of the bars, clamps securing the braces against lateral movement on the bars, of a fork pivoted in the braces and having prongs adapted to be thrown into contact with the ground, and means for throwing the prongs into contact whereby the rear of the harrow is raised as the harrow moves.

2. The combination with a harrow of braces secured to the rear thereof, a fork with prongs pivotally supported by the braces and adapted to be thrown into engagement with the ground while the harrow is moving, a trigger pivoted to one of the braces for throwing the fork forward to engage the ground, a catch pivoted to the trigger to hold the fork against backward pressure of the prongs, and a wire secured to the trigger by which the same is operated.

In witness whereof I have signed my name in the presence of two witnesses.

WILLIAM G. VANCE.

Witnesses:
L. E. HUGHES,
I. E. YODER.

---

Copies of this patent may be obtained for five cents each, by addressing the "Commissioner of Patents, Washington, D. C."